US012564966B2

(12) United States Patent
Hirayama et al.

(10) Patent No.: US 12,564,966 B2
(45) Date of Patent: Mar. 3, 2026

(54) TOOL CHECKING DEVICE, STORAGE DEVICE STORING TOOL CHECKING PROGRAM, AND TOOL CHECKING METHOD FOR ROBOT ARM

(71) Applicant: MAYEKAWA MFG. CO., LTD., Tokyo (JP)

(72) Inventors: Junta Hirayama, Tokyo (JP); Masaru Tokumoto, Tokyo (JP); Tomoki Yamashita, Tokyo (JP); Kenichiro Kimura, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 236 days.

(21) Appl. No.: 18/265,739

(22) PCT Filed: Dec. 10, 2021

(86) PCT No.: PCT/JP2021/045548
§ 371 (c)(1),
(2) Date: Jun. 7, 2023

(87) PCT Pub. No.: WO2022/138236
PCT Pub. Date: Jun. 30, 2022

(65) Prior Publication Data
US 2024/0033934 A1 Feb. 1, 2024

(30) Foreign Application Priority Data
Dec. 24, 2020 (JP) ................................. 2020-215843

(51) Int. Cl.
*B25J 9/16* (2006.01)
*B25J 15/00* (2006.01)

(52) U.S. Cl.
CPC ......... *B25J 9/1697* (2013.01); *B25J 15/0066* (2013.01); *B25J 9/1674* (2013.01); (Continued)

(58) Field of Classification Search
CPC .... B25J 9/1697; B25J 15/0066; B25J 9/1674; G05B 2219/39468; G05B 2219/40589
See application file for complete search history.

(56) References Cited

U.S. PATENT DOCUMENTS

2009/0271036 A1 10/2009 Kock et al.
2014/0148939 A1 5/2014 Nakano et al.
(Continued)

FOREIGN PATENT DOCUMENTS

JP H05318239 A 12/1993
JP H06134638 A 5/1994
(Continued)

OTHER PUBLICATIONS

2010234451 English translation (Year: 2010).*
(Continued)

*Primary Examiner* — Jay Khandpur
(74) *Attorney, Agent, or Firm* — ROSSI, KIMMS & McDOWELL LLP

(57) ABSTRACT

A tool checking device for a robot arm includes: a tool movement control unit configured to control the robot arm so as to move a tool attached to the robot arm to a defined position; an imaging control unit configured to control an imaging device so as to capture an image of the tool moved to the defined position; and a determination unit configured to determine whether the tool satisfies a tool condition regarding a tool type or tool state that needs to be satisfied, on the basis of a captured image imaged by the imaging device.

12 Claims, 8 Drawing Sheets

(52) U.S. Cl.

CPC .............. *G05B 2219/39468* (2013.01); *G05B 2219/40589* (2013.01)

(56) References Cited

U.S. PATENT DOCUMENTS

| | | | |
|---|---|---|---|
| 2016/0334777 A1 * | 11/2016 | Sato | .................. B23Q 17/0909 |
| 2018/0272543 A1 | 9/2018 | Kayama et al. | |
| 2020/0117161 A1 | 4/2020 | Cheng et al. | |

FOREIGN PATENT DOCUMENTS

| | | | | |
|---|---|---|---|---|
| JP | 2010234451 A | * | 10/2010 | |
| JP | 2014168823 A | * | 9/2014 | ......... B23Q 17/2233 |
| JP | 2014172099 A | | 9/2014 | |
| JP | 2016137529 A | * | 8/2016 | |
| JP | 2018158405 A | | 10/2018 | |
| JP | 2020110920 A | | 7/2020 | |
| JP | 2020179441 A | | 11/2020 | |

OTHER PUBLICATIONS

JP 2014168823 A English translation (Year: 2014).*

JP 2016137529 English translation (Year: 2016).*

Office Action issued in European Appln. No. 21910385.0 mailed on Oct. 21, 2024.

Extended European Search Report issued in European Appln. No. 21910385.0, mailed Apr. 4, 2024.

English translation of Written Opinion issued in Intl. Appln. No. PCT/JP2021/045548, mailed Jan. 25, 2022, previously cited in IDS filed Jun. 7, 2023.

International Preliminary Report on Patentability issued in Intl. Appln. No. PCT/JP2021/045548, mailed Jul. 6, 2023. English translation provided.

International Search Report issued in Intl. Appln. No. PCT/JP2021/045548 mailed Jan. 25, 2022. English translation provided.

Written Opinion issued in Intl. Appln. No. PCT/JP2021/045548 mailed Jan. 25, 2022.

\* cited by examiner

TOOL CHECKING DEVICE, STORAGE DEVICE STORING TOOL CHECKING PROGRAM, AND TOOL CHECKING METHOD FOR ROBOT ARM

TECHNICAL FIELD

The present disclosure relates to a tool checking device, a storage device storing a tool checking program, and a tool checking method for a robot arm.

BACKGROUND

Conventionally, a robot arm is known to which a tool is interchangeably attached to perform processing or operation on an object. For example, in the robot arm disclosed in Patent Document 1, one of multiple types of tools is attached to the robot arm depending on processing to be performed on the object. The robot arm can grasp the object by opening and closing the tool.

CITATION LIST

Patent Literature

Patent Document 1: JP2018-158405A

SUMMARY

Problems to be Solved

In order to appropriately perform operations such as processing by the robot arm, tool conditions need to be satisfied, such as the tool attached being of the proper type and in the proper state (e.g., open state or closed state), depending on processing to be performed. In this regard, Patent Document 1 does not disclose a specific configuration for accurately determining whether the tool satisfies the tool conditions.

An object of the present disclosure is to provide a tool checking device, a storage device storing a tool checking program, and a tool checking method for a robot arm whereby it is possible to accurately determine whether a tool satisfies a tool condition.

Solution to the Problems

A tool checking device for a robot arm according to at least one embodiment of the present disclosure includes: a tool movement control unit configured to control the robot arm so as to move a tool attached to the robot arm to a defined position; an imaging control unit configured to control an imaging device so as to capture an image of the tool moved to the defined position; and a determination unit configured to determine whether the tool satisfies a tool condition regarding a tool type or tool state that needs to be satisfied, on the basis of a captured image imaged by the imaging device.

A storage device storing a tool checking program for a robot arm according to at least one embodiment of the present disclosure stores a tool checking program that is configured to cause a computer to execute: a tool movement control step of controlling the robot arm so as to move a tool attached to the robot arm to a defined position; an imaging control step of controlling an imaging device so as to capture an image of the tool moved to the defined position; and a determination step of determining whether the tool satisfies a tool condition regarding a tool type or tool state that needs to be satisfied, on the basis of a captured image imaged by the imaging device.

A tool checking method for a robot arm according to at least one embodiment of the present disclosure includes: a tool movement control step of controlling the robot arm so as to move a tool attached to the robot arm to a defined position; an imaging control step of controlling an imaging device so as to capture an image of the tool moved to the defined position; and a determination step of determining whether the tool satisfies a tool condition regarding a tool type or tool state that needs to be satisfied, on the basis of a captured image imaged by the imaging device.

Advantageous Effects

According to the present disclosure, there is provided a tool checking device, a storage device storing a tool checking program, and a tool checking method for a robot arm whereby it is possible to accurately determine whether a tool satisfies a tool condition.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
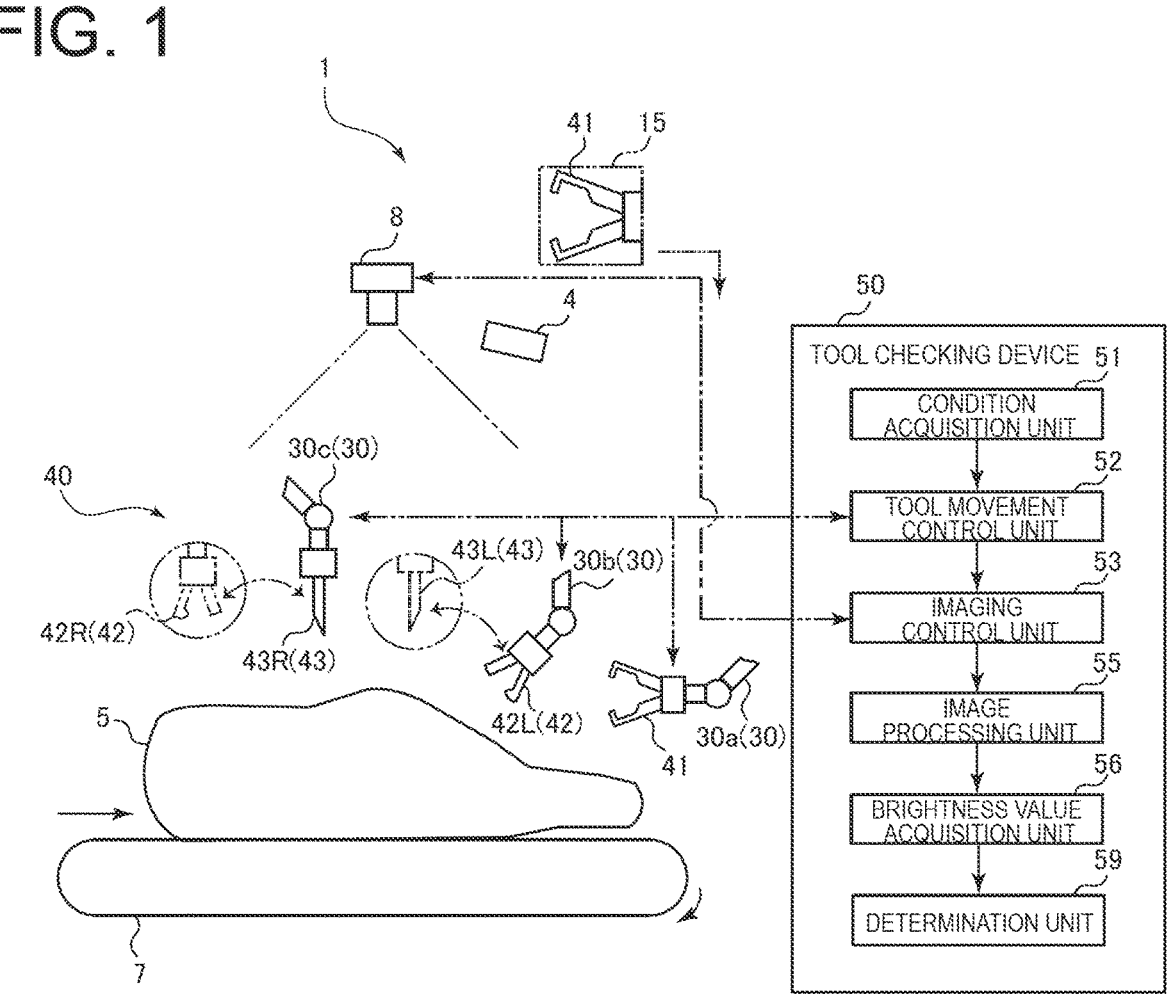
FIG. 1 is a diagram of a workpiece processing system according to an embodiment.

FIG. 1 is a diagram of a workpiece processing system 1 according to an embodiment. The workpiece processing system 1 according to an embodiment is provided to process a workpiece 5 using a tool 40. The workpiece 5 is an object to be processed by the tool 40. Examples of the workpiece 5 include food products such as agricultural products, livestock products, and marine products. The food product may be a fresh food product or processed food product. The following describes an embodiment in which the workpiece 5 is fresh meat.

The workpiece processing system 1 according to an embodiment includes a conveyance device 7 for conveying the workpiece 5, a robot arm 30 for processing the workpiece 5, an imaging device 8 for capturing an image of the tool 40, an illumination unit 4 for illuminating an area captured by the imaging device 8, and a tool checking device 50 for a robot arm.

The conveyance device 7 according to an embodiment is a belt conveyor for conveying the workpiece 5 in the horizontal direction.

The imaging device 8 according to an embodiment is provided to capture an image of the tool 40 from above. In this embodiment, the captured image 15 of the imaging device 8 is a planar image. FIG. 1 illustrates a captured image 15 of a damper 41 (described later), which is an example of the tool 40.

In an embodiment, the robot arm 30 is equipped with the tool 40. In an embodiment, the tool checking device 50 checks whether the tool 40 is proper or not on the basis of the captured image 15. Details of the configurations of the robot arm 30, the tool 40, and the tool checking device 50 will be described later.

In another embodiment, the conveyance device 7 may grasp and convey the workpiece 5 in a suspended position. The imaging device 8 may be configured to capture an image of the tool 40 along the horizontal direction, or may be configured to capture an image of the tool 40 along a direction inclined with respect to the horizontal direction. Further, the workpiece processing system 1 may not include the illumination unit 4. In this case, the function of the illumination unit 4 may be included in the imaging device 8.

The configuration of the robot arm 30 will be described. The robot arm 30 according to an embodiment is an industrial robot. More specifically, for example, the robot arm 30 is an articulated robot. The robot arm 30 may be a vertical articulated robot, a horizontal articulated robot, or a combination thereof.

The robot arm 30 according to an embodiment includes robot arms 30a, 30b, 30c. In an embodiment, the tool 40 attached to the robot arm 30 is made of a metallic material. Further, the tool 40 according to an embodiment has a surface that reflects light more easily than the workpiece 5, for example.

The tool 40 according to an embodiment includes a clamper 41 for gripping the workpiece 5, a chuck 42 for chucking the workpiece 5, and a knife 43 for cutting the workpiece 5.

In an embodiment, the damper 41 is attached to the robot arm 30a, and the chuck 42 and the knife 43 are attached to the robot arm 30b or the robot arm 30c.

In an embodiment, left-right symmetrical tools 40 are prepared to be used according to the type of workpiece 5. As a specific example, the chuck 42 includes chucks 42L and 42R, the knife 43 includes knives 43L and 43R, and these tools 40 are selectively attached to the robot arms 30b and 30c. For example, when the workpiece 5 conveyed by the conveyance device 7 is either a left limb or a right limb of livestock, the chuck 42L and the knife 43R are attached to the robot arms 30b and 30c, respectively. When the workpiece 5 is the other, the knife 43L and the chuck 42R are attached to the robot arms 30b and 30c, respectively. In an embodiment, the attachment work is performed by an operator. In another embodiment, the attachment work may be performed by separate robots.

The damper 41 and the chuck 42 according to an embodiment obtain driving force from a driving source to perform opening and closing operations. In an embodiment, an air cylinder (not shown) is used as the driving source. In this case, the inlet and outlet provided in each of the clamper 41 and the chuck 42 are connected to the air cylinder via air pipes. A hydraulic cylinder or a motor may be used as the driving source.

In another embodiment, the workpiece processing system 1 may not include the left-right symmetrical tools 40. For example, the chuck 42 may include only one of chucks 42L and 42R. Similarly, the knife 43 may include only one of knives 43L, 43R. In still another embodiment, each of the robot arms 30 may be equipped with only one tool 40.

Further, the workpiece processing system 1 is not limited to having a plurality of robot arms 30. A single robot arm 30 may be selectively equipped with multiple types of tools 40 or only one tool 40.

The configuration of the tool checking device 50 for a robot arm (hereinafter also referred to as "tool checking device 50") will be described. The tool checking device 50 uses a tool condition regarding the tool type or tool state that needs to be satisfied by the tool 40 as a criterion for checking. In an embodiment, the tool check is performed based on an evaluation value regarding the captured image 15. The evaluation value according to an embodiment is a brightness value regarding the captured image 15 as described later.

The tool type is the type of the tool 40 that should be attached to the robot arm 30. The tool type according to an embodiment is the damper 41, the chuck 42, or the knife 43. For example, if the knife 43L is attached to the robot arm 30b even though the chuck 42L should be attached, the tool condition regarding the tool type is not satisfied. Such cases can occur, for example, if the operator inadequately replaces the tool 40.

The tool state is the state that should be met by the tool 40 attached to the robot arm 30. The tool state according to an embodiment includes the open state or closed state of the damper 41 and the chuck 42, and the normal state of the knife 43. For example, if the tool 40 such as the damper 41 or the chuck 42 should be in the closed state but is in the open state, the tool condition regarding the tool state is not satisfied. Such cases can occur, for example, if connection between the damper 41 or the chuck 42 and the air cylinder through the air pipe is inadequate. On the other hand, if the knife 43 is missing even though it should be in the normal state, the tool condition regarding the tool state is not satisfied. Such cases can occur, for example, due to the continuous use of the knife 43.

In an embodiment, the tool types and tool states are managed in associated with each other. Thus, the tool checking device 50 can check whether the type and state are both proper in a single check. As a specific example, the tool checking device 50 may determine in a single check whether the tool condition corresponding to the damper 41 as the tool type and the open state as the tool state is satisfied. Alternatively, it may determine in a single check whether the tool condition corresponding to the knife 43L as the tool type and the normal state as the tool state is satisfied.

In another embodiment, the tool types and tool states do not have to be associated with each other. For example, the tool checking device 50 may separately determine whether the tool condition regarding the tool type and the tool condition regarding the tool state are satisfied.

In another embodiment, the tool condition may be a condition related only to the tool type. In other words, only whether the type of the tool 40 attached to the robot arm 30 is proper may be determined. Alternatively, the tool condition may be a condition related only to the tool state. For example, in an embodiment where the robot arm 30 is equipped with only one tool 40, only whether the state of the tool 40 is proper is determined.

The configuration of the tool checking device 50 will be described. The tool checking device 50 according to an embodiment includes a condition acquisition unit 51, a tool movement control unit 52, an imaging control unit 53, an image processing unit 55, a brightness value acquisition unit 56, and a determination unit 59. The functions of these components are implemented by a processor 91 (see FIG. 6) as will be described later.

The condition acquisition unit 51 according to an embodiment is configured to acquire a tool condition according to a work schedule (operation schedule) of the robot arm 30 after the tool condition is determined to be satisfied. For example, if work with the damper 41 in the open state is scheduled as the work after the tool condition is determined to be satisfied, the condition acquisition unit 51 acquires the tool condition where the tool type is the damper 41 and the tool state is the open state.

In an embodiment, a plurality of works may be scheduled for each of a plurality of robot arms 30. In this case, the condition acquisition unit 51 may acquire tool conditions according to the plurality of robot arms 30.

Figure 2:
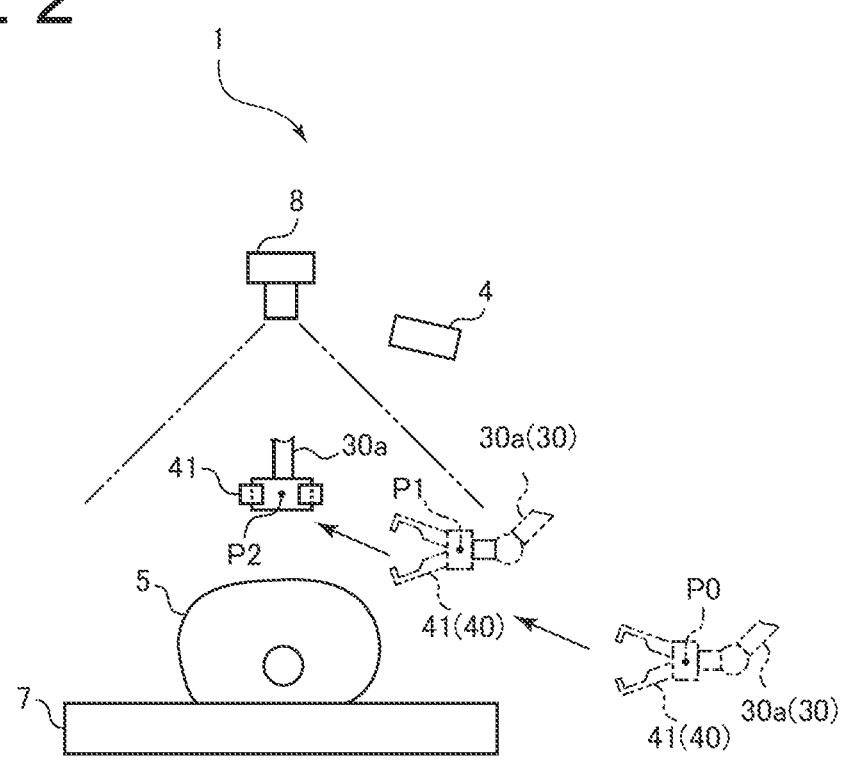
FIG. 2 is a diagram showing the flow of moving a tool to a defined position according to an embodiment.

The tool movement control unit 52 according to an embodiment is provided to control the robot arm 30 so as to move the tool 40 attached to the robot arm 30 to a defined position P2 (see FIG. 2). As a more specific example, the tool movement control unit 52 is provided to control the robot arm 30 so as to move the tool 40 from an inner position P1 (see FIG. 2) within an imaging range of the imaging device 8 to a defined position P2 where a difference in the evaluation value according to whether the tool condition is satisfied is greater than in the inner position P1.

Further, the tool movement control unit 52 according to an embodiment is configured to selectively control the robot arm 30 to be controlled among a plurality of the robot arms 30. In an embodiment, the robot arm 30 to be controlled is specified on the basis of the tool condition acquired by the condition acquisition unit 51.

The imaging control unit 53 according to an embodiment is provided to control the imaging device 8 so as to capture an image of the tool 40 moved to the defined position P2.

The image processing unit 55 according to an embodiment is configured to perform, on the captured image 15, image processing associated with the tool condition, and generate a processed image 18 (see FIGS. 5A and 5B) in which a related area 17 associated with the tool condition is extracted. The processed image 18 generated is an image based on the captured image 15. The processed image 18 may be generated by subjecting the entire captured image 15 to image processing, or may be generated by subjecting a partial image of the captured image 15 to image processing.

The related area 17 according to an embodiment is an area set such that there is a difference in the image between when the tool condition is satisfied and when it is not satisfied. The processed image 18 obtained by extracting this related area 17 is used to determine by the determination unit 59 whether the tool condition is satisfied.

An example of the related area 17 associated with the tool condition will be described. For example, the related area 17 associated with the tool condition regarding the tool state of the damper 41 is set to be an area where at least a part of the movable portion of the damper 41 enters or exits depending on the state of the damper 41 (open or closed state). The related area 17 may be set at the time of determination by the determination unit 59 or may be set in advance before the determination.

The related area 17 according to an embodiment is an area along at least a part of the contour of the tool 40 that satisfies the tool condition and is an area to be trimmed.

In an embodiment, the processed image 18 in which the related area 17 is extracted is an image generated by masking. In this embodiment, the image processing unit 55 is configured to perform masking using a reference image 14 (see FIG. 4) associated with the tool condition, and generate a processed image 18 in which the related area 17 associated with the tool condition is extracted. The reference image 14 associated with the tool condition will be described later.

The brightness value acquisition unit 56 according to an embodiment is configured to acquire a brightness value of an area included in the captured image 15 as the evaluation value based on the captured image 15. The area included in the captured image 15 may be, for example, the entire area of the processed image 18. The brightness value acquisition unit 56 may acquire only a brightness value in the related area 17 as the area included in the captured image 15.

In an embodiment, the brightness value acquisition unit 56 acquires an RGB brightness value of the area included in the captured image 15.

The determination unit 59 according to an embodiment is configured to determine whether the tool 40 satisfies the tool condition regarding the tool type or tool state that needs to be satisfied, on the basis of the captured image 15 imaged by the imaging device 8. As a more specific example, the determination unit 59 is configured to determine whether the tool condition is satisfied, on the basis of the captured image 15 of the tool 40 attached to the robot arm 30 to be controlled by the tool movement control unit 52. In an embodiment where a plurality of robot arms 30 are controlled, the determination unit 59 may sequentially determine whether the tool condition is satisfied for the tools 40 attached to these robot arms 30.

The determination unit 59 according to an embodiment is configured to determine whether the tool condition is satisfied on the basis of the evaluation value regarding the captured image 15. The evaluation value may be, for example, a brightness value of the processed image 18, or more specifically, may be the sum of brightness values of the processed image 18. The evaluation value may be a brightness value of the captured image 15 that has not been processed.

In another embodiment, the condition acquisition unit 51 may not be provided. For example, if the tool condition is uniquely defined, then the image processing unit 55 may perform image processing associated with this tool condition to generate a processed image 18, and the determination unit 59 may determine whether this tool condition is satisfied on the basis of the processed image 18.

FIG. 2 is a diagram showing the flow of moving the tool 40 to the defined position P2 according to an embodiment. FIG. 2 illustrates the clamper 41 as an example of the tool 40 as viewed along the conveying direction of the convey- ance device 7.

The damper 41 according to an embodiment is moved from a movement start position P0 via an inner position P1 to the defined position P2 by controlling the robot arm 30a with the tool movement control unit 52. The movement start position P0 may be a position outside the imaging range of the imaging device 8 or a position within the imaging range. The inner position P1 and the defined position P2 are different positions from each other within the imaging range.

In an embodiment, the movement start position P0, the inner position P1, and the defined position P2 are concepts including a three-dimensional coordinate position and a rotational position (rotational posture) with the horizontal direction as the axial direction. Therefore, in the process of moving the clamper 41 from the inner position P1 to the defined position P2, the position of the clamper 41 in the three-dimensional coordinate system and the rotational posi- tion (rotational posture) of the damper 41 with the horizontal direction as the axial direction are adjusted.

In an embodiment, the defined position P2 is a position where the difference in the evaluation value regarding the captured image 15 between when the tool condition is satisfied and it is not satisfied is greater than in the inner position P1. As a more specific example, the damper 41 in the defined position P2 reflects more light toward the imaging device 8 than in the inner position P1. Therefore, when the damper 41 is in the defined position P2, the brightness value of the captured image 15 when the tool condition is satisfied increases. On the other hand, the brightness value of the captured image 15 when the tool condition is not satisfied does not change significantly regardless of whether the damper 41 is in the defined position P2 or the inner position P1. As a result, the difference in the evaluation value regarding the captured image 15 between when the tool condition is satisfied and when it is not satisfied is larger in the defined position P2 than in the inner position P1.

The evaluation value regarding the captured image 15 in the inner position P1 may be obtained experimentally (e.g., by experiment or simulation) in advance before the deter- mination by the determination unit 59.

In the above, the process of moving the clamper 41 to the defined position P2 has been described, but the other tools 40 (e.g., chuck 42 or knife 43) can also be moved in the same way by controlling the robot arms 30b and 30c with the tool movement control unit 52. Detailed Description Will be Omitted.

In another embodiment, the movement start position P0 may coincide with the inner position P1. In other words, the tool movement control unit 52 may start moving the tool 40 from the inner position P1.

In another embodiment, the rotational position (rotational posture) with the vertical direction as the axial direction may be adjusted in the process of moving the tool 40 to the defined position P2.

Figure 3:
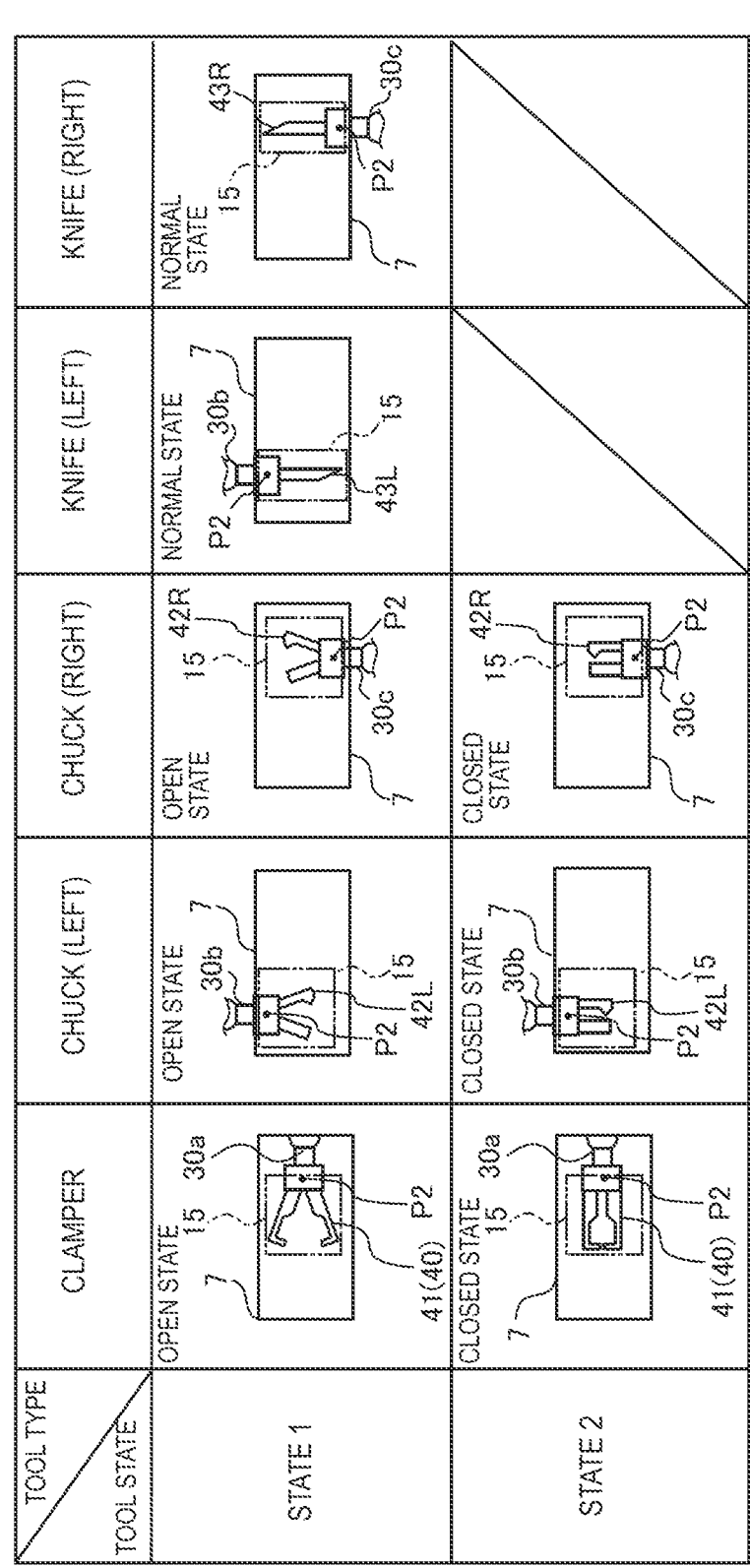
FIG. 3 is a diagram showing the defined position according to the tool type according to an embodiment.

FIG. 3 is a diagram showing the defined position P2 of the tool 40 according to an embodiment.

In FIG. 3, for convenience, the center of gravity of the portion of the tool 40 connected to the robot arm 30 is illustrated as the defined position P2, but as described above, the defined position P2 may include the rotational position (rotational posture) of the tool 40 with the horizontal or vertical direction as the axial direction.

In an embodiment, different defined positions P2 are set depending on the tool type to be satisfied. For example, the damper 41, the chucks 42L, 42R, and the knife 43L, 43R may have defined positions P2 that are different from each other in the conveying direction. These defined positions P2 may be at the same height.

In an embodiment, when the tool type to be satisfied is the same, the same defined position P2 is set regardless of the tool state to be satisfied. For example, when the tool type to be satisfied is the damper 41, the same defined position P2 is set regardless of the tool state (open or closed state) to be satisfied.

In an embodiment, the imaging device 8 has a wide imaging range such that any defined position P2 can be captured. In this case, a partial image extracted according to the defined position P2 from the image generated by the imaging device 8 is used as the captured image 15. The image processing to extract the partial image may be, for example, trimming or cropping.

In another embodiment, the imaging range of the captured image 15 may be so narrow that it can only include either defined position P2. In this case, the optical axis direction of the imaging device 8 may be adjusted according to the defined position P2, and the image generated by the imaging device 8 may be treated as the captured image 15 as it is.

Figure 4:
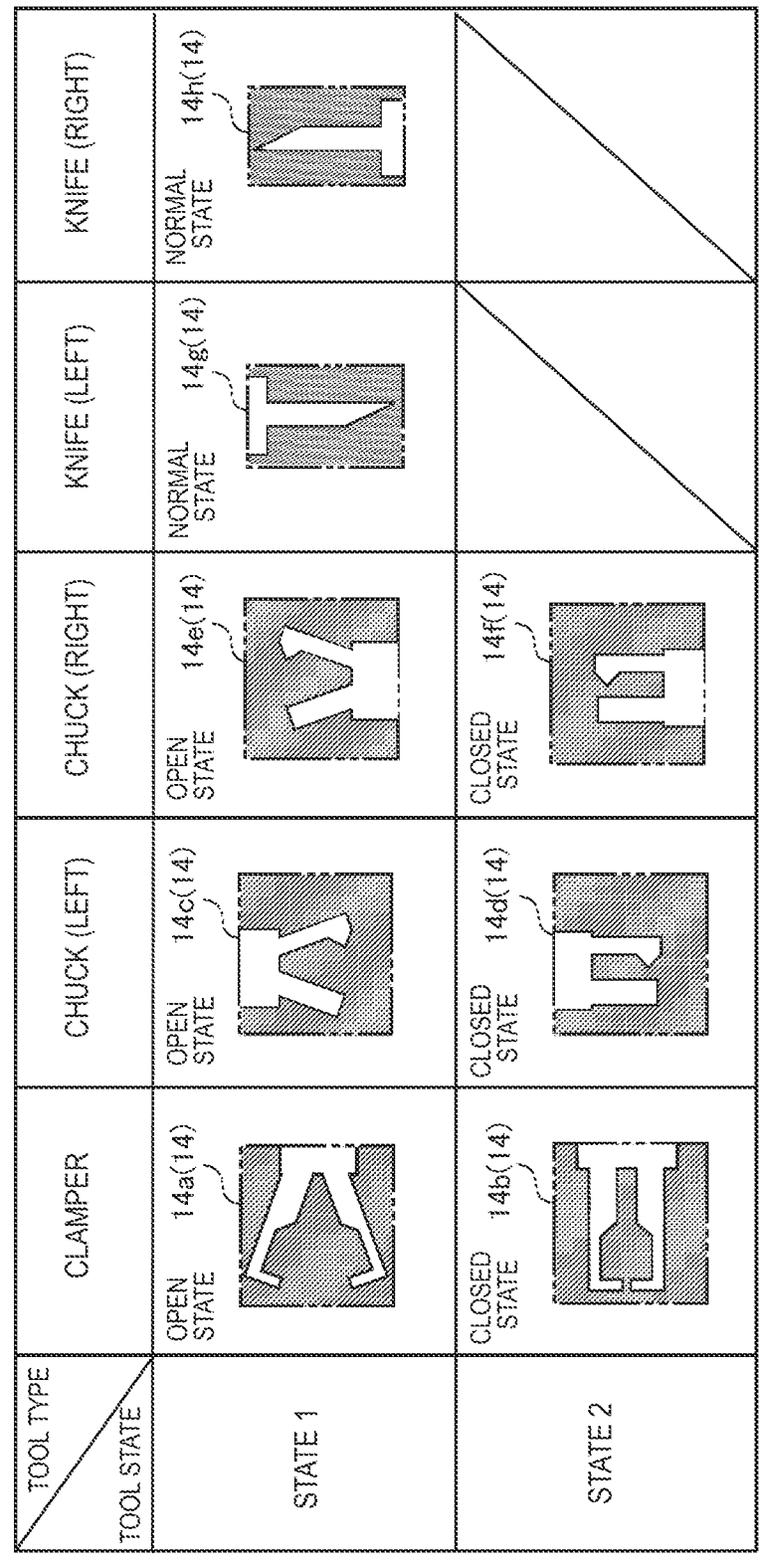
FIG. 4 is a diagram showing reference image data which is data of a reference image for executing image processing according to an embodiment.

FIG. 4 is a diagram showing reference image data 96 which is data of a reference image 14 for executing image processing according to an embodiment.

The reference image 14 according to an embodiment is associated with the tool condition.

The image processing unit 55 according to an embodi- ment applies masking to the captured image 15 using the reference image 14 associated with the tool condition. As a result, an image in which the related area 17 associated with the tool condition is extracted is generated as the processed image 18 (see FIGS. 5A and 5B).

In an embodiment, as an example, a total of eight types of reference images 14a to 14h are prepared corresponding to tool conditions.

Figure 5A:
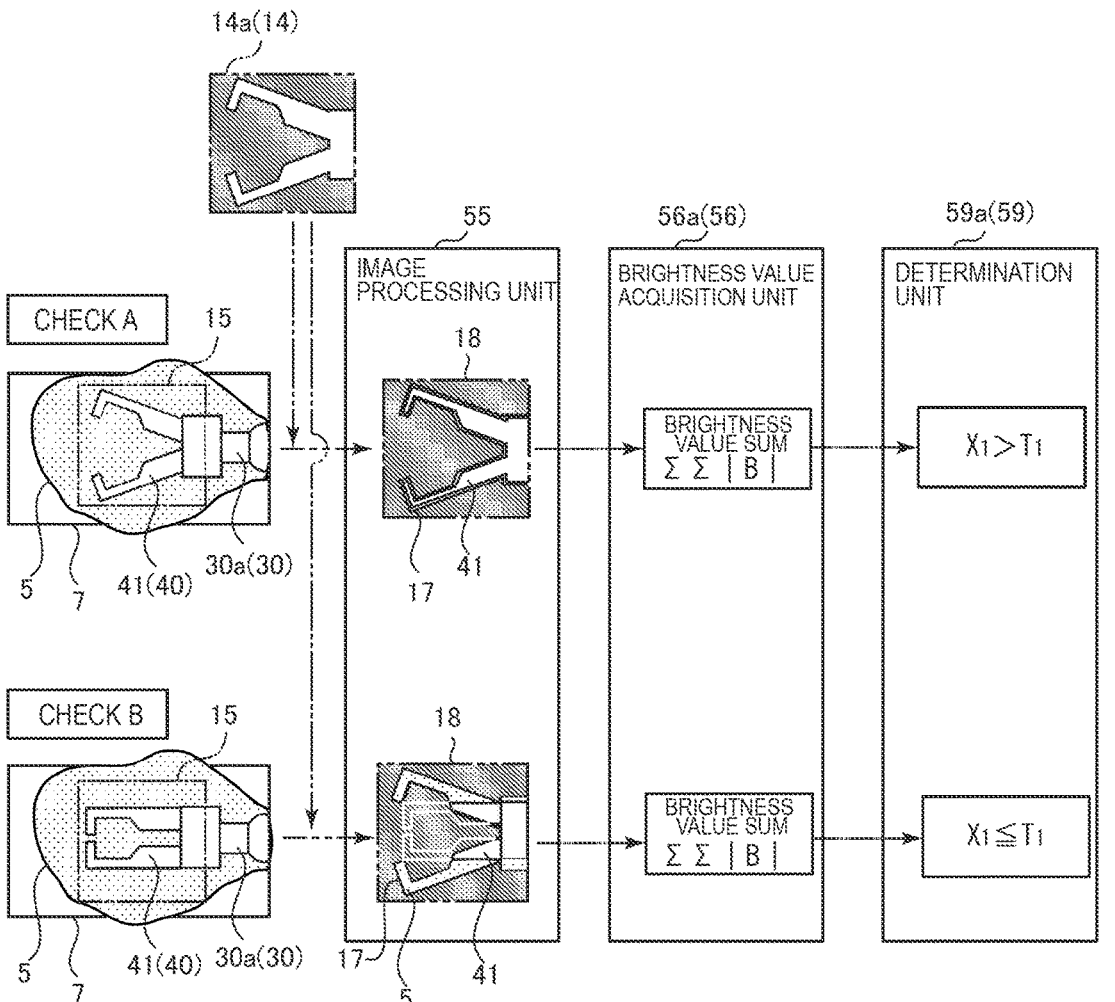
FIG. 5A is a diagram for describing a determination method by a determination unit according to an embodiment.
Figure 5B:
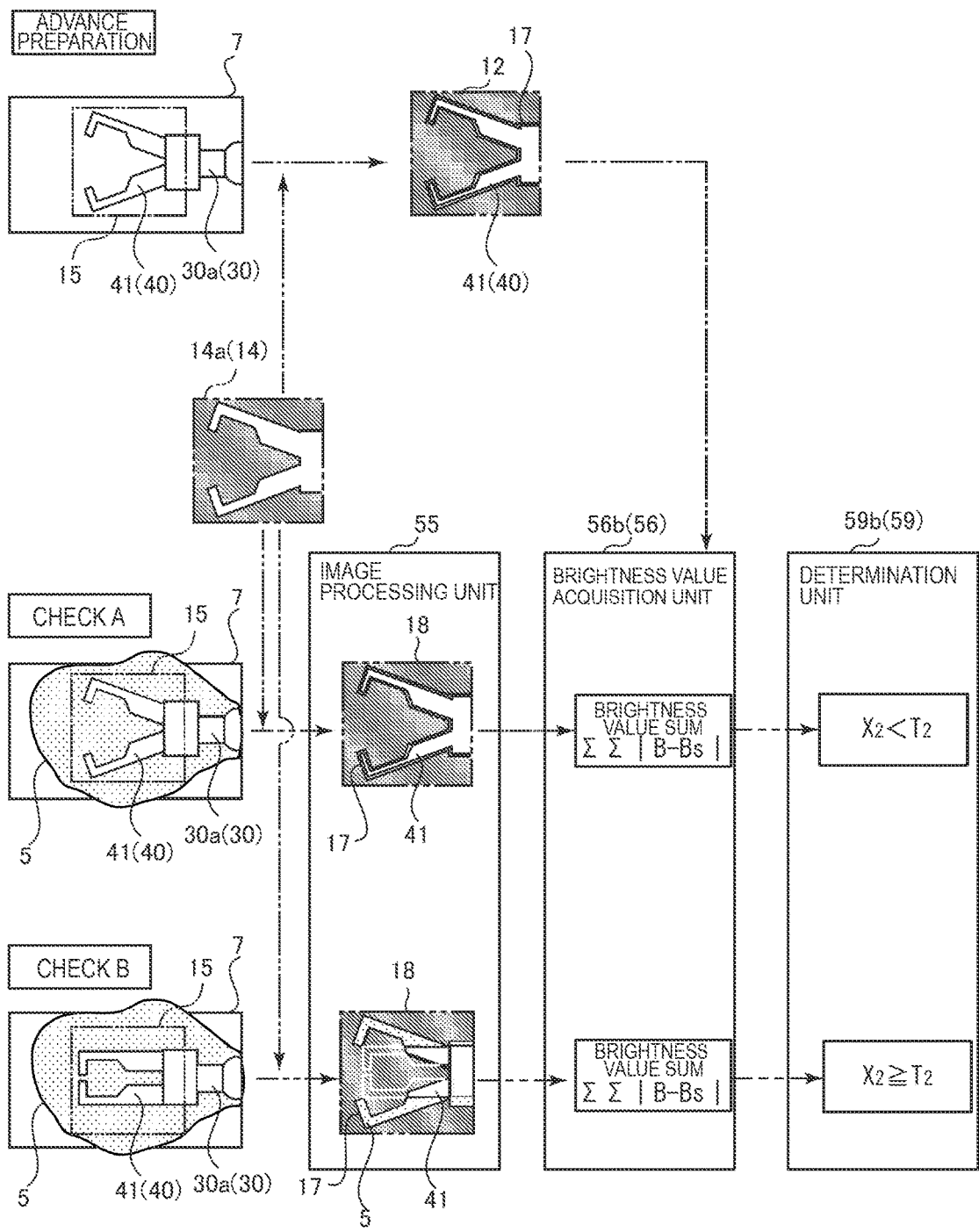
FIG. 5B is another diagram for describing a determination method by a determination unit according to an embodiment.

FIGS. 5A and 5B are each a diagram for describing a determination method by the determination unit 59a, 59b (59) according to an embodiment.

In the determination shown in FIGS. 5A and 5B, the tool condition that needs to be satisfied is the damper 41 in the open state. "Check A" in the figures shows the checking process of the damper 41 in the open state, which satisfies the above tool condition. "Check B" in the figures shows the checking process of the damper 41 in the closed state, which does not satisfy the above tool condition.

In an embodiment, in both checks A and B, the workpiece 5 is arranged below the tool 40 when imaged by the imaging device 8 (in FIGS. 5A and 5B, the workpiece 5 is hatched for ease of reading the figures). However, the workpiece 5 may not be visible in the background of the tool 40 when imaging by the imaging device 8.

In an embodiment, during checks A and B, the image processing unit 55 applies masking to the respective cap- tured images 15 using the reference image 14 associated with the tool condition to generate the respective processed images 18. Then, the brightness value acquisition unit 56*a*, 56*b* (56) acquires brightness values of the processed images 18.

The brightness value acquisition unit 56*a* shown in FIG. 5A is configured to acquire the sum $X_1$ of brightness values of the processed image 18*a*.

For example, when the number of pixels in the x-direction (horizontal direction) of the processed image 18 is M, the number of pixels in the y-direction (vertical direction) is N, and the brightness value at any pixel is B, the sum $X_1$ of brightness values acquired by the brightness value acquisition unit 56*a* is defined by the equation (1). Here, i is any natural number equal to or less than the number of pixels in the horizontal direction of the processed image 18, and j is any natural number equal to or less than the number of pixels in the vertical direction.

(Expression 1)

$$X_1 = \sum_{i=0}^{M} \sum_{j=0}^{N} |B_{ij}| \qquad \text{Eq. 1}$$

In another embodiment, $X_1$ may be the sum of brightness values of the related area 17 in the processed image 18.

The determination unit 59*a* according to an embodiment is configured to determine whether the tool condition is satisfied on the basis of the sum $X_1$ of brightness values acquired.

In an embodiment, the determination unit 59*a* determines whether the tool condition is satisfied in checks A and B on the basis of the sum $X_1$ of brightness values acquired by the brightness value acquisition unit 56*a* in each of checks A and B. For example, in check A, the damper 41 appears over almost the entire related area 17 of the processed image 18, and objects (e.g., workpiece 5) other than the clamper 41 hardly appear in the related area 17. In this case, the sum $X_1$ of brightness values of the processed image 18 acquired by the brightness value acquisition unit 56*a* exceeds a threshold $T_1$, which is the criterion, and the determination unit 59*a* determines that the tool condition is satisfied.

In contrast, in check B, the proportion occupied by the clamper 41 in the related area 17 of the processed image 18 is smaller (the movable portion of the damper 41 is mostly out of the related area 17). As a result, the proportion of other objects (e.g., workpiece 5) in the related area 17 increases. Accordingly, the sum $X_1$ of brightness values of the processed image 18 falls below the threshold $T_1$, and the determination unit 59*a* determines that the tool condition is not satisfied.

The brightness value acquisition unit 56*b* shown in FIG. 5B is configured to acquire the sum $X_2$ of differences between brightness values identified by the following equation (2) using $B_{ij}$ which is a brightness value of each pixel of the processed image 18, and $B_{sij}$ which is a brightness value set for each pixel according to the tool condition.

(Expression 2)

$$X_2 = \sum_{i=0}^{M} \sum_{j=0}^{N} |B_{ij} - Bs_{ij}| \qquad \text{Eq. 2}$$

The brightness value acquisition unit 56*b* according to an embodiment acquires the sum $X_2$ of differences between the brightness value $B_{ij}$ of each pixel of the processed image 18 and the brightness value $B_{sij}$ of each pixel of a normal image 12 corresponding to each pixel of the processed image 18 in each of checks A and B.

In an embodiment, as advance preparation, the image processing unit 55 applies masking to the captured image 15 of the tool 40 that is determined to satisfy the tool condition. As a result, a normal image 12, which is a processed image obtained by extracting the related area 17 associated with the tool condition, is generated in advance. By acquiring the normal image 12, the brightness value acquisition unit 56*b* acquires the brightness value Bs $B_{sij}$.

In another embodiment, the image processing unit 55 may not generate the normal image 12. For example, the brightness value $B_{sij}$ set for each pixel of the processed image 18 may be stored in some memory in advance.

In another embodiment, $B_{sij}$ may be the brightness value for each pixel in the related area 17 only, instead of the brightness value for each pixel in the processed image 18. In this case, $B_{sij}$ also represents the brightness value of each pixel corresponding to the related area 17 only.

The determination unit 59*b* according to an embodiment determines whether the tool condition is satisfied on the basis of the sum $X_2$ of differences between brightness values acquired.

The determination unit 59*b* according to an embodiment determines whether the tool condition is satisfied in checks A and B on the basis of the sum $X_2$ of differences between brightness values acquired by the brightness value acquisition unit 56*b* in each check. For example, in check A, since the difference between the processed image 18 and the normal image 12 is small, the sum $X_2$ of differences between brightness values falls below a threshold $T_2$, which is the criterion, and the determination unit 59*b* determines that the tool condition is satisfied.

In contrast, in check B, since the difference between the processed image 18 and the normal image 12 is large, the sum $X_2$ of differences between brightness values is not less than the threshold $T_2$. Thus, the determination unit 59*b* determines that the tool condition is not satisfied.

FIGS. 5A and 5B show the example where the tool 40 that does not satisfy the tool condition is the damper 41 in the closed state, but the same determination result can be obtained with the same determination method even if another tool 40 that does not satisfy the tool condition is judged.

Further, in FIGS. 5A and 5B, the damper 41 in the open state is shown as an example of the tool condition that needs to be satisfied, but the same determination result can be obtained with the same determination method even if the target to be judged is another tool condition.

Figure 6:
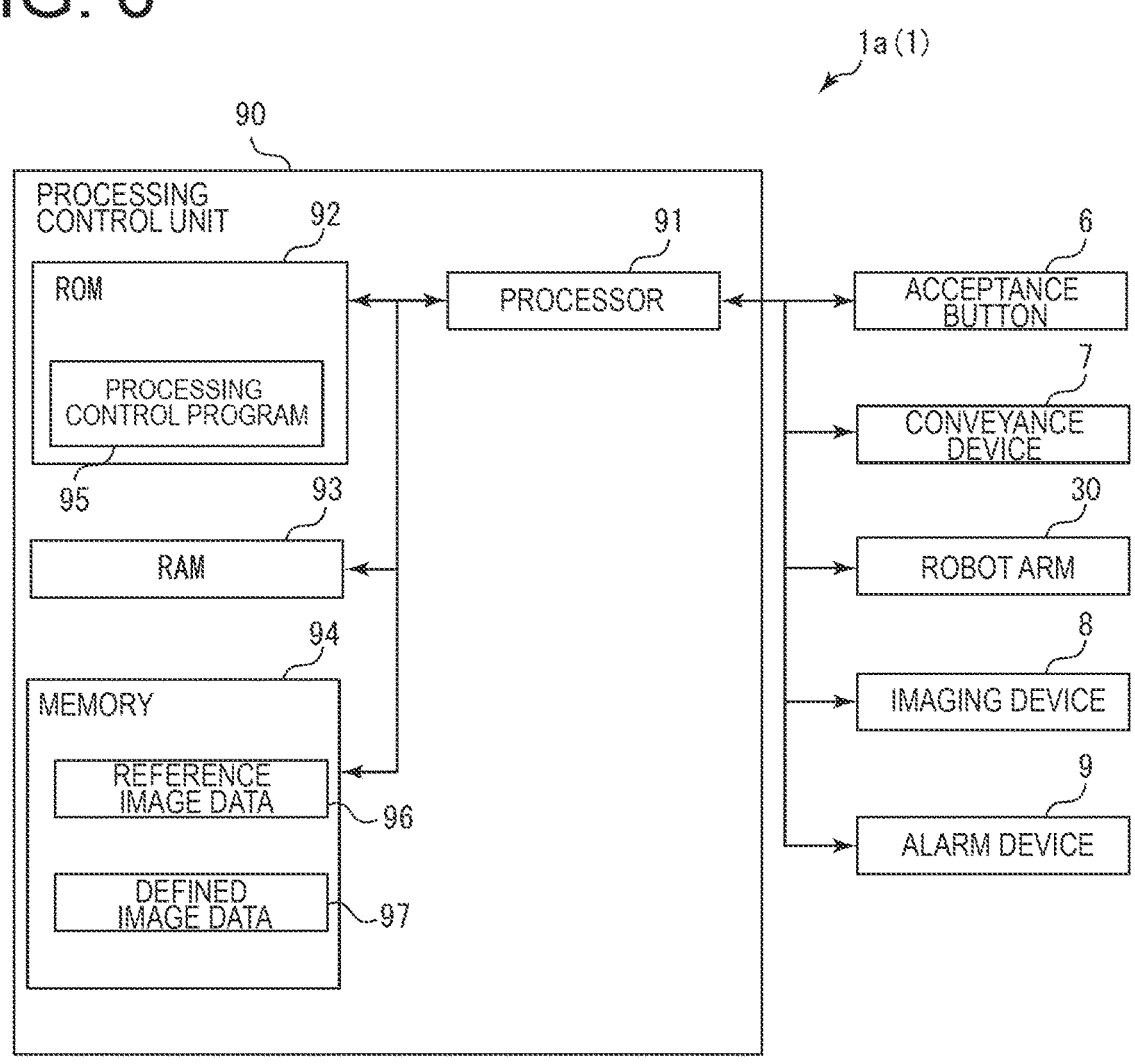
FIG. 6 is a block diagram showing an electrical configuration of a workpiece processing system according to an embodiment.

FIG. 6 is a block diagram showing an electrical configuration of the workpiece processing system 1 according to an embodiment. The components of the aforementioned tool checking device 50 are implemented by a processing control unit 90 shown in FIG. 6. A specific implementation method will be described below with reference to FIG. 7.

The workpiece processing system 1 is provided with a processing control unit 90 including a processor 91.

The processor 91 reads out a processing control program (tool checking program) 95 stored in ROM 92 and loads it into RAM 93 to execute instructions included in the loaded processing control program 95. The processor 91 is CPU, GPU, MPU, DSP, other various kinds of computation devices, or a combination thereof. The processor 91 may be implemented by an integrated circuit of PLD, ASIC, FPGA, MCU, etc. The ROM 92 is an example of the storage device.

A memory 94, which is a component of the processing control unit 90, is a non-volatile memory which stores reference image data 96 and defined position data 97 indicating the defined position P2. The defined position data 97 according to an embodiment may be a data table also including identification data indicating the robot arm 30 to be controlled. For example, the defined position data 97 may associate the data indicating the defined position P2 of the damper 41 with the identification data of the robot arm 30a to which the clamper 41 is attached.

The processor 91 according to an embodiment is connected to an acceptance button 6, the conveyance device 7, the robot arm 30, the imaging device 8, and the alarm device 9 via an interface (not shown).

The acceptance button 6 according to an embodiment accepts a tool condition that needs to be satisfied by the tool 40. The acceptance button 6 may be a button with a mechanical structure or a touch panel button.

In an embodiment, the operator may input the tool condition to the acceptance button 6 when attaching the tool 40 to the robot arm 30. The input tool condition may be, for example, a plurality of conditions corresponding to the number of robot arms 30. The acceptance button 6 outputs the accepted tool condition to the processor 91. When the operator inputs the tool condition to the acceptance button 6, the operator may also input the robot arm 30 corresponding to the tool condition.

The processor 91 acquires the tool condition by acquiring data output from the acceptance button 6.

In another embodiment, the acceptance button 6 may not be provided. In this case, the processor 91 may acquire the tool condition indicated by data included in the processing control program 95, for example.

The conveyance device 7, the robot arm 30, the imaging device 8, and the alarm device 9 according to an embodiment operate in response to control signals received from the processor 91. The robot arm 30 according to an embodiment moves the tool 40 to a defined position P2 in response to a control signal received. In an embodiment, the robot arm 30 further performs processing on the workpiece 5 in response to a control signal received.

The imaging device 8 according to an embodiment captures an image in response to a control signal received and outputs the generated captured image 15 to the processor 91. The processor 91 according to an embodiment outputs the image acquired from the imaging device 8 to the RAM 93. The captured image 15 may be stored in the memory 94 instead of the RAM 93.

The alarm device 9 according to an embodiment is a device for issuing an alarm in response to a control signal received when the processor 91 determines that the tool condition is not satisfied. The alarm device 9 according to an embodiment may be an image display device, a speaker, a light emitting device, or a combination thereof.

Figure 7:
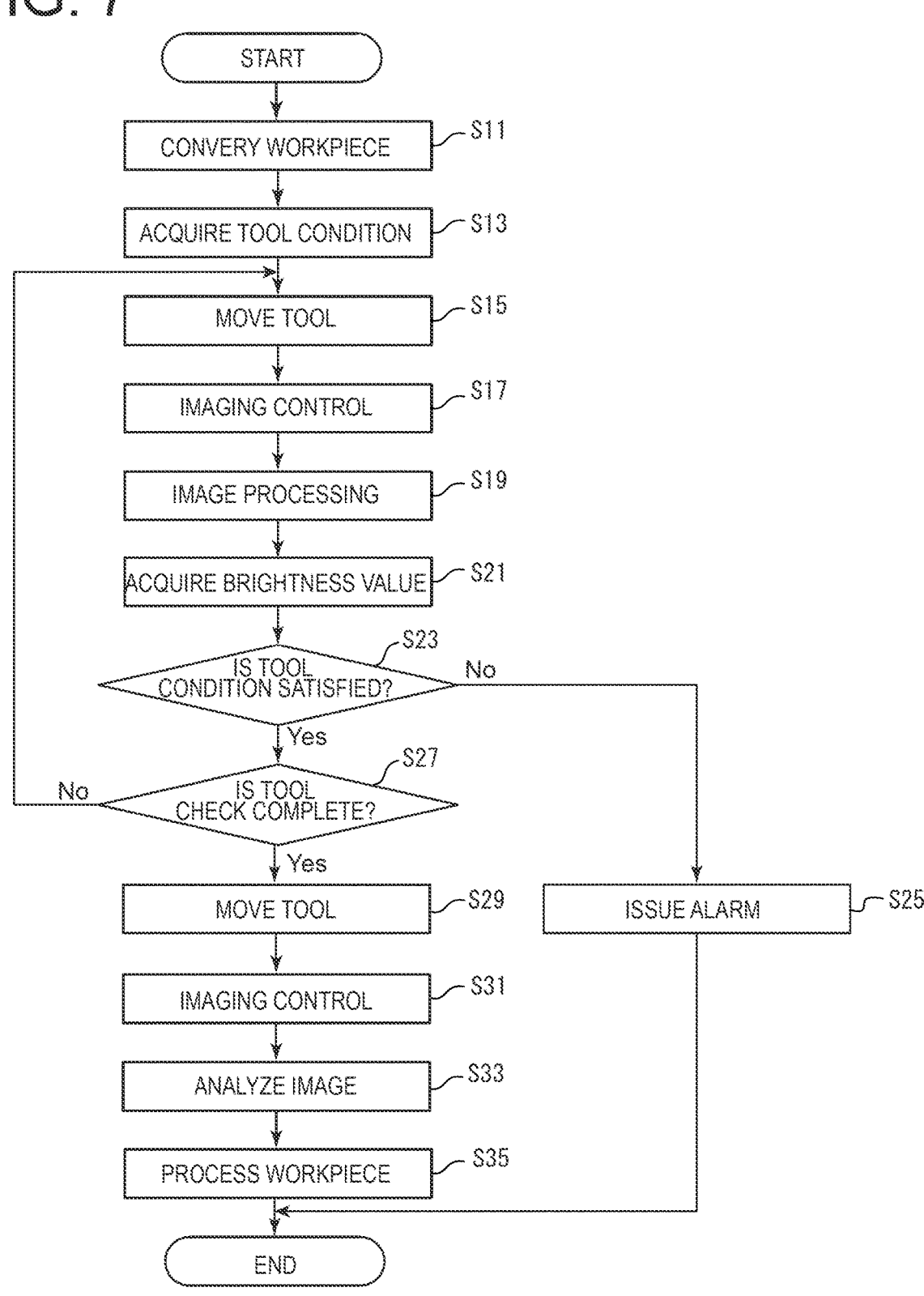
FIG. 7 is a flowchart of a processing control process according to an embodiment.

FIG. 7 is a flowchart of a processing control process according to an embodiment. In the processing control process, the processor 91 loads the processing control program 95 stored in the ROM 92 into the RAM 93 to execute the following steps. Information processed by the processor 91 in executing the process is stored in the RAM 93 or the memory 94, as appropriate. In the following description, "step" is abbreviated as "S".

The processor 91 controls the conveyance device 7 so that the workpiece 5 is conveyed to the processing area (S11).

Then, the processor 91 acquires a tool condition that needs to be satisfied by the tool 40 (S13). For example, the processor 91 acquires a tool condition on the basis of data output from the acceptance button 6. The processor 91 executing S11 functions as the condition acquisition unit 51. In an embodiment where a plurality of robot arms 30 are provided, the processor 91 may acquire a tool condition corresponding to each robot arm 30.

The processor 91 refers to the tool condition acquired in S13 and the defined position data 97 stored in the memory 94 and selectively controls the robot arm 30 to be controlled (S15). Thus, the tool 40 attached to the robot arm 30 to be controlled is moved to the defined position P2. For example, if the tool condition acquired in S11 includes "clamper 41 in the open state", the processor 91 performs control so that the damper 41 attached to robot arm 30a moves to the defined position P2, and the chuck 42 and the knife 43 attached to the robot arms 30b and 30c retreat to other positions (e.g., movement start position P0). The processor 91 executing S15 functions as the tool movement control unit 52.

The processor 91 controls the imaging device 8 so as to capture an image of the tool 40 moved to the defined position P2 by execution of S15 (S17). The processor 91 stores the captured image 15 based on imaging by the imaging device 8 into the RAM 93, for example. The processor 91 executing S17 functions as the imaging control unit 53.

The processor 91 processes the captured image 15 generated in S17 (S19). In an embodiment, the processor 91 refers to the reference image data 96 stored in the memory 94 and acquires the reference image 14 according to the tool condition acquired in S13. Then, using the acquired reference image 14, masking is applied to the captured image 15 acquired in S17. As a result, the processor 91 generates an image in which the related area 17 associated with the tool condition is extracted as a processed image 18. The processor 91 executing S19 functions as the image processing unit 55.

The processor 91 acquires brightness values of the processed image 18 on the basis of the processed image 18 generated (S21). In an embodiment, the processor 91 acquires the sum $X_1$ of brightness values or the sum $X_2$ of differences between brightness values, for example, on the basis of the equation (1) or equation (2).

When acquiring the sum $X_2$ of differences between brightness values, the processor 91 may refer to the normal image 12 stored in the memory 94 to acquire the brightness value Bs ii of each pixel.

The processor 91 executing S21 functions as the brightness value acquisition unit 56a, 56b (56).

On the basis of the acquired brightness values, the processor 91 determines whether the tool condition acquired in S13 is satisfied (S23).

For example, the processor 91 determines whether the tool condition is satisfied by comparing the sum $X_1$ of brightness values or the sum $X_2$ of differences between brightness values with the threshold $T_1$ or the threshold Ta. The processor 91 executing S23 functions as the determination unit 59a, 59b (59).

If it is determined that the tool condition is not satisfied (S23: NO), the processor 91 controls the alarm device 9 to issue an alarm (S25), and ends this control process.

In an embodiment, when the alarm is issued, the operator recognizes that the tool condition is not satisfied, and can replace the tool 40 or perform other operations on the robot arm 30 to satisfy the tool condition.

In an embodiment, if it is determined that the tool condition is satisfied (S23: YES), the processor 91 determines whether the tool check is completed (S27). For example, when there remains a tool condition that has not been determined to be satisfied or not among multiple tool conditions acquired in S13 (S27: NO), the processor 91 repeats S15 to S23. On the other hand, if the determination of all tool conditions is completed (S27: YES), the processor 91 proceeds to S29.

The processor 91 controls the robot arm 30 so that the tool 40 in the defined position P2 retreats to a different position (e.g., movement start position P0) (S29). The processor 91 then controls the imaging device 8 to capture an image of the workpiece 5 (S31) and analyzes the image generated by the imaging device 8 (S33). In an embodiment, the processor 91 performs image analysis for suitable processing on the imaged workpiece 5. As a specific example, if the workpiece 5 is a boned limb of livestock, image analysis is performed to identify the position of the bone in the workpiece 5. The analysis may be performed, for example, by inputting the image taken in S31 to a previously machine-learned trained model. In this case, the processor 91 may be equipped with a GPU for performing arithmetic processing based on the machine-learned trained model. The processor 91 controls the robot arm 30 so that the workpiece 5 is processed on the basis of the result of image analysis (S35). After the processing of the workpiece 5 is completed, the processor 91 ends this control process.

In another embodiment, the execution timing of S11 may be after it is determined that the tool check is completed (S27: YES). In this case, the workpiece 5 does not appear in the captured image 15 in the imaging of S17.

In another embodiment, for example, when the tool condition to be judged is uniquely defined, neither S13 nor S27 may be executed. The uniquely defined tool condition means not only a single tool condition but also multiple tool conditions.

Hereinafter, the tool checking device 50 for a robot arm, the tool checking program for a robot arm, and the tool checking method for a robot arm according to some embodiments will be described.

(1) A tool checking device 50 for a robot arm according to at least one embodiment of the present disclosure includes: a tool movement control unit 52 configured to control the robot arm 30 so as to move a tool 40 attached to the robot arm 30 to a defined position P2; an imaging control unit 53 configured to control an imaging device 8 so as to capture an image of the tool 40 moved to the defined position P2; and a determination unit 59 configured to determine whether the tool 40 satisfies a tool condition regarding a tool type or tool state that needs to be satisfied, on the basis of a captured image 15 imaged by the imaging device 8.

With the above configuration (1), before capturing an image by the imaging device 8, the tool movement control unit 52 controls the robot arm 30 so as to move the tool 40 to the defined position P2. This reduces the variation in the captured image 15 of the tool 40 when the tool condition is satisfied. As a result, the determination unit 59 can accurately determine whether the tool condition is satisfied on the basis of the captured image 15. Thus, it is possible to accurately determine whether the tool 40 satisfies the tool condition.

(2) In some embodiments, in the above configuration (1), the determination unit 59 is configured to determine whether the tool condition is satisfied, on the basis of an evaluation value regarding the captured image 15. The tool movement control unit 52 is configured to control the robot arm 30 so as to move the tool 40 from an inner position P1 within an imaging range of the imaging device 8 to the defined position P2 where a difference in the evaluation value according to whether the tool condition is satisfied is greater than in the inner position P1.

With the above configuration (2), since the tool 40 is moved to the defined position P2 in accordance with the control by the tool movement control unit 52, the evaluation value regarding the captured image 15 changes significantly according to whether the tool condition is satisfied. Therefore, it is possible to accurately determine whether the tool condition is satisfied.

For example, the brightness value of the related area 17 when the tool condition is satisfied is larger when the clamper 41 is in the defined position P2 than in the inner position P1. On the other hand, when the tool condition is not satisfied, objects other than the tool 40, such as the workpiece 5, appear in the related area 17 regardless of whether the clamper 41 is in the inner position P1 or the defined position P2, and the brightness value of the related area 17 does not change significantly in both positions. As a result, the difference in the brightness value according to whether the tool condition is satisfied increases when the damper 41 is in the defined position P2. Thus, the determination unit 59b can accurately determine whether the tool condition is satisfied.

(3) In some embodiments, in the above configuration (1) or (2), the tool checking device 50 further includes a brightness value acquisition unit 56 configured to acquire a brightness value of an area (related area 17) included in the captured image 15. The determination unit 59 is configured to determine whether the tool condition is satisfied on the basis of the brightness value acquired.

With the above configuration (3), the determination unit 59 can perform quantitative determination as to whether the tool condition is satisfied on the basis of the brightness value of the area included in the captured image 15. Thus, it is possible to accurately determine whether the tool 40 satisfies the tool condition.

(4) In some embodiments, in the above configuration (3), the brightness value acquisition unit 56a (56) is configured to acquire the sum $X_1$ of brightness values of the area (related area 17) included in the captured image 15. The determination unit 59a (59) is configured to determine whether the tool condition is satisfied on the basis of the sum $X_1$ of brightness values acquired.

With the above configuration (4), the determination unit 59a (59) determines whether the tool condition is satisfied on the basis of the sum $X_1$ of brightness values of the area included in the captured image 15. Therefore, even when the imaging conditions of the tool 40 change, it is possible to accurately determine whether the tool condition is satisfied.

For example, if the tool 40 is used continuously, the imaging conditions can change due to the workpiece 5 adhering to the tool 40. In this case, even if the tool 40 to be judged satisfies the tool condition, the brightness value in the captured image 15 tends to decrease, which may cause erroneous determination as to whether the tool condition is satisfied. In this regard, in the embodiment where the brightness value acquisition unit 56a acquires the sum $X_1$ of brightness values, even if the workpiece 5 adheres to the tool 40, the rate of decrease of the sum $X_1$ of brightness values is small. Therefore, even when the imaging conditions change, the accuracy of determination whether the tool condition is satisfied is maintained.

(5) In some embodiments, in any one of the above configurations (1) to (4), the tool movement control unit 52 is configured to selectively control the robot arm 30 to be controlled among a plurality of the robot arms 30. The determination unit 59 is configured to determine whether the tool 40 attached to the robot arm 30 to be controlled satisfies the tool condition.

With the above configuration (5), the tool movement control unit 52 selectively moves the robot arm 30 equipped with the tool 40 that requires determination regarding the tool condition. Thus, the tool checking device 50 can efficiently determine whether the tool condition is satisfied.

(6) In some embodiments, in any one of the above configurations (1) to (5), the tool checking device 50 further includes an image processing unit 55 configured to perform, on the captured image 15, image processing associated with the tool condition, and generate a processed image 18 in which a related area 17 associated with the tool condition is extracted. The determination unit 59 is configured to determine whether the tool condition is satisfied, on the basis of the processed image 18.

With the above configuration (6), the related area 17 associated with the tool condition is extracted to generate the processed image 18, and on the basis of the processed image 18 generated, the determination unit 59 determines whether the tool condition is satisfied. Thus, it is possible to accurately determine whether the tool 40 satisfies the tool condition, on the basis of the related area 17 associated with the tool condition.

(7) In some embodiments, in the above configuration (6), the image processing unit 55 is configured to apply masking to the captured image 15 using a reference image 14 associated with the tool condition, and generate an image in which the related area 17 associated with the tool condition is extracted as the processed image 18.

With the above configuration (7), the determination unit 59 can accurately determine whether the tool 40 satisfies the tool condition on the basis of the processed image 18 masked.

(8) A storage device (ROM 92) storing a tool checking program 95 for a robot arm according to at least one embodiment of the present disclosure stores a tool checking program 95 that is configured to cause a computer to execute: a tool movement control step (S15) of controlling the robot arm 30 so as to move a tool 40 attached to the robot arm 30 to a defined position P2; an imaging control step (S17) of controlling an imaging device 8 so as to capture an image of the tool 40 moved to the defined position P2; and a determination step (S23) of determining whether the tool 40 satisfies a tool condition regarding a tool type or tool state that needs to be satisfied, on the basis of a captured image 15 imaged by the imaging device 8.

With the above configuration (8), it is possible to accurately determine whether the tool 40 satisfies the tool condition for the same reason as the above (1).

(9) A tool checking method for a robot arm according to at least one embodiment of the present disclosure includes: a tool movement control step (S15) of controlling the robot arm 30 so as to move a tool 40 attached to the robot arm 30 to a defined position P2; an imaging control step (S17) of controlling an imaging device 8 so as to capture an image of the tool 40 moved to the defined position P2; and a determination step (S23) of determining whether the tool 40 satisfies a tool condition regarding a tool type or tool state that needs to be satisfied, on the basis of a captured image 15 imaged by the imaging device 8.

With the above configuration (9), it is possible to accurately determine whether the tool 40 satisfies the tool condition for the same reason as the above (1).

REFERENCE SIGNS LIST

8 Imaging device
14 Reference image
17 Related area
18 Processed image
30 Robot arm

40 Tool
50 Tool checking device
52 Tool movement control unit
53 Imaging control unit
55 Image processing unit
56 Brightness value acquisition unit
59 Determination unit
95 Tool checking program
P1 Inner position
P2 Defined position

The invention claimed is:

1. A tool checking device for a robot arm of a workpiece processing system including the robot arm to which a tool for processing a food product as a workpiece is attached and an imaging device for capturing an image of the workpiece, the workpiece being processed by the tool based on results of the image analysis of the captured image of the workpiece, the tool checking device comprising:

a tool movement control unit configured to control the robot arm so as to move the tool attached to the robot arm to a defined position;

an imaging control unit configured to control the imaging device so as to capture an image of the tool moved to the defined position; and a determination unit configured to determine whether the tool satisfies a tool condition regarding a tool type or a tool state that needs to be satisfied, on a basis of the captured image imaged by the imaging device, wherein the tool movement control unit is configured to control the robot arm so as to move the tool to the defined position that is a position within a first portion of an imaging range of the imaging device and excluded from a second portion of the imaging range of the imaging device outside the first portion of the imaging range.

2. The tool checking device for a robot arm according to claim 1, wherein the determination unit is configured to determine whether the tool condition is satisfied, on the basis of an evaluation value regarding the captured image, and wherein the tool movement control unit is configured to control the robot arm so as to move the tool from an inner position within an imaging range of the imaging device to the defined position where a difference in the evaluation value according to whether the tool condition is satisfied is greater than in the inner position.

3. The tool checking device for a robot arm according to claim 1, further comprising a brightness value acquisition unit configured to acquire a brightness value of an area included in the captured image, wherein the determination unit is configured to determine whether the tool condition is satisfied on the basis of the brightness value acquired.

4. The tool checking device for a robot arm according to claim 3, wherein the brightness value acquisition unit is configured to acquire a sum of brightness values of the area included in the captured image, and wherein the determination unit is configured to determine whether the tool condition is satisfied on the basis of the sum of brightness values acquired.

5. The tool checking device for a robot arm according to claim 1, wherein the tool movement control unit is configured to selectively control the robot arm to be controlled among a plurality of the robot arms, and wherein the determination unit is configured to determine whether the tool attached to the robot arm to be controlled satisfies the tool condition.

6. The tool checking device for a robot arm according to claim 1, further comprising an image processing unit configured to perform, on the captured image, image processing associated with the tool condition, and generate a processed image in which a related area associated with the tool condition is extracted, and wherein the determination unit is configured to determine whether the tool condition is satisfied, on the basis of the processed image.

7. The tool checking device for a robot arm according to claim 6, wherein the image processing unit is configured to apply masking to the captured image using a reference image associated with the tool condition, and generate an image in which the related area associated with the tool condition is extracted as the processed image.

8. The tool checking device for a robot arm according to claim 1, wherein the tool movement control unit is configured to control the robot arm so as to move a first tool attached to the robot arm to a first defined position within the first portion of the imaging range of the imaging device and to move a second tool, different from the first tool, attached to the robot arm to a second defined position within the first portion of the imaging range of the imaging device different from the first defined position within the first portion of the imaging range.

9. The tool checking device for a robot arm according to claim 1, wherein the imaging control unit is configured to control the imaging device so as to capture the image of the tool moved to the defined position with the workpiece appearing in the captured image.

10. A storage device storing a tool checking program for a robot arm of a workpiece processing system including the robot arm to which a tool for processing a food product as a workpiece is attached and an imaging device for capturing an image of the workpiece, the workpiece being processed by the tool based on results of the image analysis of the captured image of the workpiece, the tool checking program being configured to cause a computer to execute:

a tool movement control step of controlling the robot arm so as to move the tool attached to the robot arm to a defined position;

an imaging control step of controlling the imaging device so as to capture an image of the tool moved to the defined position; and a determination step of determining whether the tool satisfies a tool condition regarding a tool type or a tool state that needs to be satisfied, on a basis of the captured image imaged by the imaging device, wherein the tool movement control step controls the robot arm so as to move the tool to the defined position that is a position within a first portion of an imaging range of the imaging device and excluded from a second portion of the imaging range of the imaging device outside the first portion of the imaging range.

11. A tool checking method for a robot arm of a workpiece processing system including the robot arm to which a tool for processing a food product as a workpiece is attached and an imaging device for capturing an image of the workpiece, the workpiece being processed by the tool based on results of the image analysis of the captured image of the workpiece, the tool checking method comprising:

a tool movement control step of controlling the robot arm so as to move the tool attached to the robot arm to a defined position;

an imaging control step of controlling the imaging device so as to capture an image of the tool moved to the defined position; and a determination step of determining whether the tool satisfies a tool condition regarding a tool type or a tool state that needs to be satisfied, on a basis of the captured image imaged by the imaging device, wherein the tool movement control step controls the robot arm so as to move the tool to the defined position that is a position within a first portion of an imaging range of the imaging device and excluded from a second portion of the imaging range of the imaging device outside the first portion of the imaging range.

12. A workpiece processing system comprising:

a robot arm to which a tool for processing a food product as a workpiece is attached;

an imaging device for capturing an image of the workpiece, the robot arm being configured to process the workpiece by the tool based on results of the image analysis of the captured image of the workpiece; and a tool checking device for checking the tool attached to the robot arm, the tool checking device comprising:

a tool movement control unit configured to control the robot arm so as to move the tool attached to the robot arm to a defined position;

an imaging control unit configured to control the imaging device so as to capture an image of the tool moved to the defined position; and a determination unit configured to determine whether the tool satisfies a tool condition regarding a tool type or a tool state that needs to be satisfied, on a basis of the captured image imaged by the imaging device, wherein the tool movement control unit is configured to control the robot arm so as to move the tool to the defined position that is a position within a first portion of an imaging range of the imaging device and excluded from a second portion of the imaging range of the imaging device outside the first portion of the imaging range.

* * * * *